United States Patent [19]

Grove et al.

[11] 4,326,601

[45] Apr. 27, 1982

[54] AERIAL LIFT PLATFORM APPARATUS WITH CAPACITY INDICATOR

[75] Inventors: John L. Grove, Greencastle; Frederick W. Kuhne, Willow Hill, both of Pa.

[73] Assignee: JLG Industries, Inc., McConnellsburg, Pa.

[21] Appl. No.: 154,758

[22] Filed: May 30, 1980

[51] Int. Cl.$^3$ ...................... G01D 21/00; B66C 13/14; B66F 11/04

[52] U.S. Cl. .......................................... 182/2; 182/18; 212/157; 116/298

[58] Field of Search ............... 182/2, 18, 19; 212/157; 214/673; 116/298, 299

[56] References Cited

U.S. PATENT DOCUMENTS

| | | | |
|---|---|---|---|
| 1,773,589 | 8/1930 | Lichtenberg | 116/298 |
| 2,374,298 | 4/1945 | Nasset | 116/299 |
| 2,569,890 | 10/1951 | Hicks | 116/299 |
| 3,011,261 | 12/1961 | Riley | 33/125 R |
| 3,122,125 | 2/1964 | Towne | 116/299 |
| 3,223,249 | 12/1965 | Cady | 212/157 |
| 3,490,015 | 1/1970 | Nixon | 340/522 |
| 3,922,789 | 12/1975 | Sarrell | 33/125 R |
| 3,961,685 | 6/1976 | Kozai | 182/19 |
| 4,052,602 | 10/1977 | Horn | 364/424 |
| 4,211,332 | 7/1980 | Pitman | 212/157 |

*Primary Examiner*—Reinaldo P. Machado
*Attorney, Agent, or Firm*—Irvin A. Lavine

[57] ABSTRACT

A workman's lift platform apparatus has a vertically swingable and extensible boom with a workman's platform at the outer end. A color coding indicating the amount of boom extension is provided on the fly section of the boom, visible to the workman in the platform, and an indicator plate having corresponding color coding is provided adjacent the controls on the platform. A Bowden cable is connected to the indicator plate and the fly section, to move the indicator plate proportionately to the angle of the boom to the horizontal.

17 Claims, 5 Drawing Figures

AERIAL LIFT PLATFORM APPARATUS WITH CAPACITY INDICATOR

BACKGROUND OF THE INVENTION

The present invention relates to an aerial lift platform apparatus having a capacity indicator thereon, so that a workman on the platform may be able to determine the load capacity at any angle of the boom and any extension of the boom.

The prior art has recognized the desirability of providing an indication of the capacity of equipment having an extensible boom which may be luffed, that is, positioned at various angles to the horizontal.

On aerial lift platform apparatus, there has been provided an extensible boom which could be luffed to various angles, and controlled from a workman's platform at the outer end of the extensible boom; the section of the boom which was at the outer end of the boom, and to which the workman's platform is attached, and known as the fly section, had applied to the upper surface color coding, to indicate the amount of extension of the fly section, and there was provided, also, a gravity-operated pendulum, positioned adjacent a quadrant-shaped plate having a color coding thereon corresponding to the color coding of the fly section. The pendulum and plate were placed on one side of the fly section. In some positions taken by the operator, the reading of the capacity indicator of the pendulum type was difficult, requiring the operator to crane his neck in order to obtain a satisfactory view of the pendulum and indicator plate.

Kozai U.S. Pat. No. 3,961,685 discloses an indicator arrangement for a fire ladder which is capable of being luffed, there being provided a scale indicating the degrees of elevation of the ladder, a cursor moveable over the scale, a second scale spaced from the first scale and providing a representation of the extension of the ladder, with a cursor moveable over the second scale, there being provided between the two scales limit lines on the indicator plate to provide an indication of the maximum extension at a given angle of the ladder.

Nixon U.S. Pat. No. 3,490,015 provides a safe load indicator for a crane, and utilizes a Bowden cable to transmit angular movement of the boom to a somewhat complicated indicator apparatus mounted in the crane cab. Towne U.S. Pat. No. 3,122,125, Riley U.S. Pat. No. 3,011,261, Nasset U.S. Pat. No. 2,374,298 and Hicks U.S. Pat. No. 2,569,890 provide additional disclosures of boom angle indicators utilizing cables.

Aerial lift platform apparatus in the prior art provided with capacity indicators, although being of simple construction, were not readily visible to the operator in the platform. Where fire ladders, booms, and the like were provided with capacity indicators, the constructions were complex, therefore being less reliable than desired, and were not always easily read and understood by the operator.

SUMMARY OF THE INVENTION

The present invention provides a workman's lift platform apparatus which has a telescopic boom, pivotally mounted for luffing movement about a horizontal axis. Motors are provided for luffing and for extending the telescopic boom, and controls therefore are provided on a workman's platform positioned at the outer end of the fly section of the boom, and moveable about a horizontal axis, so as to remain horizontal, as the boom is luffed. The fly section of the boom is provided with color coding, to indicate the amount of extension of the boom, in zones, three zones being preferred. On the platform, and adjacent the controls, and therefore immediately visible to the workman in the platform, is a moveable indicator plate, which is color coded in correspondence to the color coding of the fly section. A flexible cable, specifically a Bowden cable, is connected to the fly section and to the platform and to the indicator plate, to cause the indicator plate to move proportionately to the angle of the boom to the horizontal. Preferably, there is provided a vertical pivotal connection between the workman's platform and the boom fly section, to permit the workman's platform to move in a horizontal plane, with means provided for causing rotation of the workman's platform about a vertical axis through substantially 180°.

Among the objects of the present invention are the provision of a workman's lift platform apparatus having a capacity indicator of simple construction, having a capacity indicator which is visible to the workman in all positions and attitudes to the workman's lift platform apparatus, which is of simple construction and reliable in operation, and which is easily comprehended by the workman. A more particular object of the present invention is to provide such an indicator in association with a workman's lift platform apparatus having a vertical and a horizontal pivotal connection between the workman's platform and the fly section of the boom on which it is supported.

Other objects and many of the attendant advantages of the present invention will be readily understood from consideration of the following specification, the claims and drawings.

DESCRIPTION OF THE PREFERRED EMBODIMENT

Figure 1:
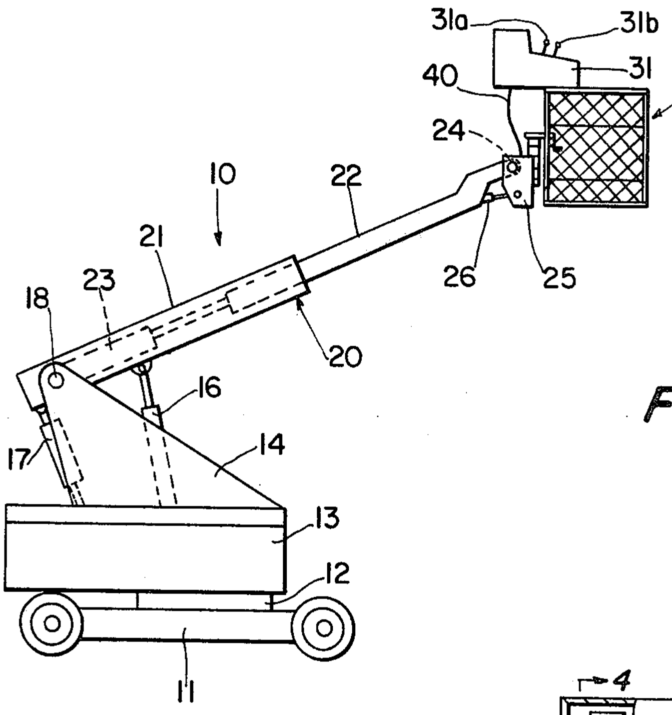
FIG. 1 is a elevational view of a workman's lift platform apparatus with capacity indicator, in accordance with the present invention.

Referring now to the drawings, wherein like or corresponding reference numerals are used to designate like or corresponding parts throughout the several views, there is shown in FIG. 1 a workman's lift platform apparatus 10 comprising a wheeled chassis 11 having a turn table 12 for rotatably supporting an upper works 13. Upper works 13 includes an engine (not shown), boom supports 14 and boom 20. The upper works includes a lift cylinder 16, and a master cylinder 17, lift cylinder 16 being a part of a conventional fluid system including a pump driven from the engine, and controlled by suitable control elements. The boom 20 is mounted for luffing movement, so that it may assume a desired inclination to the horizontal, being mounted about a horizontal pivot pin 18, carried by the boom support 14. The boom 20, as illustrated, is a two-section boom, including a base section 21 and fly section 22. A hydraulic ram 23 is carried in the base section 21, and extends and retracts the fly section 22 in telescopic manner, fluid being delivered to the hydraulic ram 23 from a pump, and under suitable controls.

At the outer end of the fly section 22, there is provided a workman's platform or basket 30, which is supported for movement on vertical and horizontal axes, as will be described hereinbelow. The horizontal axis is defined by a pivot pin 24, which supports a pivot assembly 25. Connected to the pivot assembly 25 and to the fly section 22 is a slave cylinder 26, which is connected, in known fashion, to master cylinder 17, so as to maintain the floor of the workman's platform 30 level during luffing movement of the boom 20, in response to movement of lift cylinder 16. Supported on the workman's platform 30, which has a floor and upstanding walls for the safety of the workman, is a control console 31 which has a control lever **31*a* for causing luffing of the boom, control lever 31*b* for causing extension and retraction of the boom, and other controls, not shown, for causing rotation of the upper works 13 on a vertical axis, and driving and steering of the wheeled chassis 11**, all of which are conventional.

Figure 2:
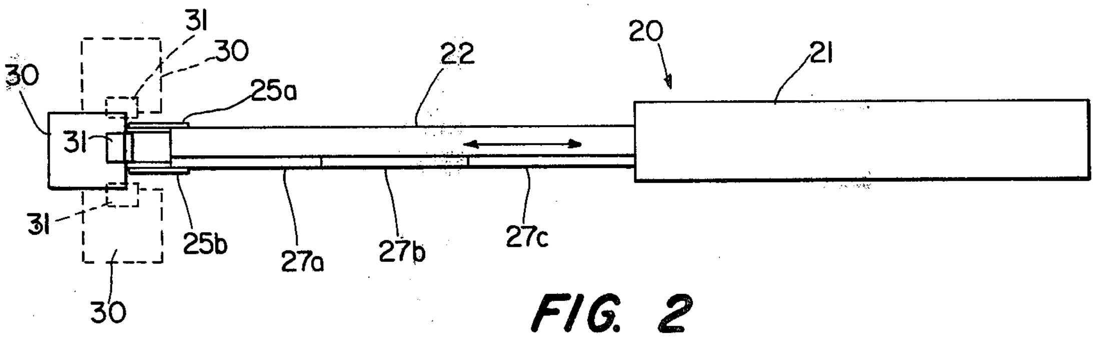
FIG. 2 is a plan view of the boom and platform of the workman's lift platform apparatus shown in FIG. 1.

Referring now to FIG. 2, the telescopic boom 20 is shown in plan view, with the platform 30 at the outer end of the fly section 22 in alternate positions. The full line position is a neutral position, and the dotted line positions show the platform rotated 90° in either direction from the neutral position, so that the platform 30 will be seen to have a range of movement of substantially 180°, from side to side of the fly section 22 of the boom 20. Also shown in FIG. 2 are colored strips **27*a*, 27*b* and 27*c* each strip being of a color which is different from and clearly distinctive from the other two strips. These strips provide a visual, color coding indicia of the extent to which the telescopic fly section 22 has been extended out of the base section 21. The color coded strips 27*a*, 27*b* and 27*c* are clearly visible to a workman standing in the workman's platform 30, and in position to manipulate the controls at the control console 31. As will be apparent, the colored strips 27*a*, 27*b* and 27*c* will be clearly visible to the workman in any position of the platform 30** upon rotation of it about the vertical axis.

Figure 3:
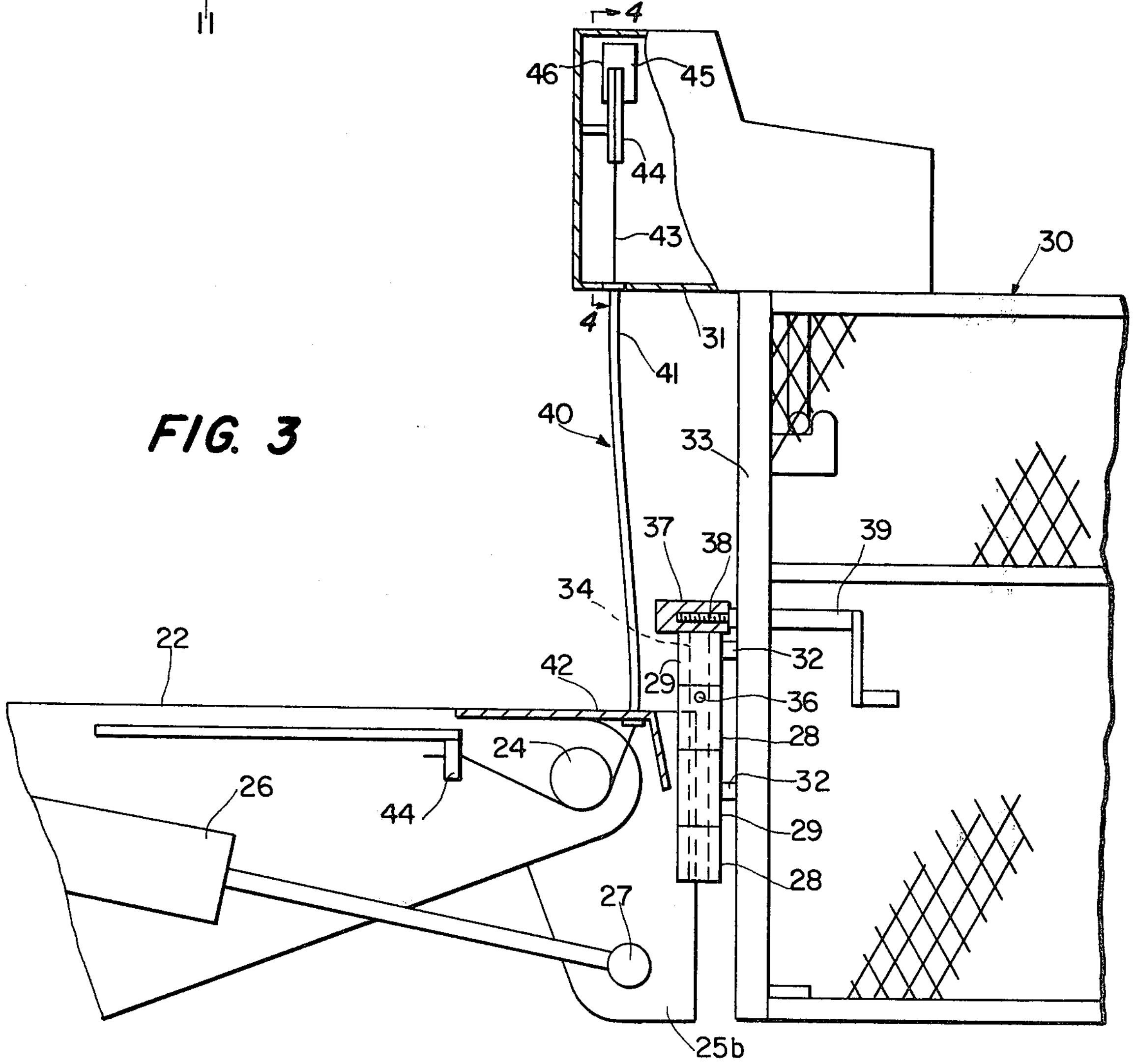
FIG. 3 is an elevational view, with parts in section, of a portion of the structure shown in FIG. 1.

In FIG. 3 there is shown the outer end of the fly section 22 and the slave leveling cylinder 26. The pivot assembly 25 comprises a pair of parallel, vertical plates **25*a* and 25*b* (see FIG. 2), plate 25*b* being shown in FIG. 3, with plate 25*a* removed. The poston rod of cylinder 26 is pinconnected by pin 27 to the pivot assembly 25, to casue horizontal pivoting movement thereof about pivot pin 24. In addition, a vertical pivoting connection is provided by a pair of spaced, aligned cylinders 28 which are secured, as by welding, to the plates 25*a* and 25*b*. Alternate aligned and spaced cylinders 29 are connected by lugs to a support frame 33 for the structure of the workman's platform 30. A pivot pin 34 extends through the aligned cylinders 28 and 29, being fixed to the cylinder 28 by a transverse pine 36, and carrying at its upper end a gear 37: a worm 38 is in mesh with the gear 37, and is carried by a crank 39. Consequently, upon rotation of the crank 39, worm 38, in engagement with the gear 37, will cause rotary movement about the axis of pivot pin 34 of the platform 30**.

Figure 4:
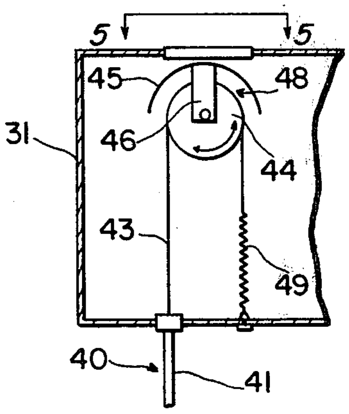
FIG. 4 is a view taken on the line 4—4 of FIG. 3.

A Bowden cable 40 is provided, having an outer sheath 41 anchored at one end to the control console 31 substantially adjacent and parallel to the axis of pivot pin 34 and at the other end to an anchor plate 42 on the pivot assembly 25. An inner wire 43 of the Bowden cable 40 passes in partial circumscribing relation to the pivot pin 24, and is secured by an anchor 44 to the boom fly section 22. At its upper end, the inner wire 43 extends out of the sheath 41 and into the console 31. A sheave 44 is journalled on a horizontal axis within the console 31, and as shown in FIG. 4, sheave 44 has secured to it an arcuate indicator plate 45, by a bracket 46. The inner wire 43 is attached to the sheave 44 as by a fastener 48, and a spring 49 extends between the end of the inner wire 43 and the console 31, to urge the inner wire 43 through the sheath 41 towards the indicator plate 45.

Figure 5:
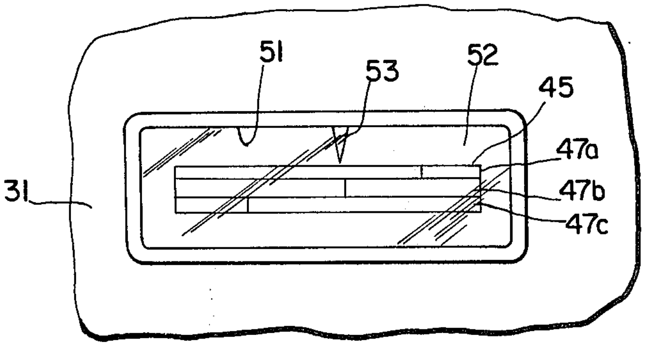
FIG. 5 is a view taken on the line 5—5 of FIG. 4.

In FIG. 5, there is shown an upper plate of the control console 31, there being an opening 51 in the plate, with a transparent plate 52 in the opening 51, the plate 52 carrying a cursor 53. Visible through the plate 52 is the indicator plate 45. The indicator plate 45 has three colored indicia strips **47*a*, 47*b* and 47*c*, corresponding to the colors of the color strips 27*a*, 27*b* and 27*c* on the boom fly section 22. Each of the strips 47*a*, 47*b* and 47*c*** may be divided into zones, with each zone containing an indication of a load capacity, such as "500 lb.", "600 lb.", etcetera.

When the workman in the workman's platform causes the boom 20 to luff, that is, to pivot about the pivot pin 18, it will have a given angle to the horizontal. Due to the leveling system of the platform 30 provided by the master cylinder 17 and the slave cylinder 26, the floor of the platform 30 will remain horizontal, so that the angle of the boom 20 relative to the horizontal is provided either by reference to the ground, or to the floor of the platform, which is parallel to the ground. The amount of movement of the boom 20 about the pivot pin 18 will be equal to the amount of movement of the platform 30 about the pivot pin 24. This latter movement is caused to move the indicator plate 45, proportionately to the amount of said movement, by the Bowden cable 40. Consequently, the angle of inclination of boom 20 is indicated by the position of indicator plate 45 relative to cursor 53. The workman in the workman's platform 30, at the control console 31 and controlling luffing and extension of the boom 20 will note the amount of extension of the fly section 22 by observing the color coding indicia provided by the colored strip **27*a*, 27*b* or 27*c* which is visible at the end of the base section 21. Observing that particular color, and glancing, then, at the corresponding color strip 47*a*, 47*b* or 47*c* on the indicator plate 45 which is opposite the cursor 53, he is directed to the proper portion of the indicator plate 45 to thereby gain an automatic identification of the particular amount of extension, by zone, of the fly section 22. The amount of rotation of the indicator plate 45, corresponding to the inclination of the boom 20, is indicated by the cursor 53, so that thereby the two factors of boom extension and boom elevation are in proportional correspondence to the particular colored indicator strip 47*a*, 47*b*, or 47*c* on the indicator plate 45 and by the amount of rotation of indicator plate 45**, respectively.

As will be understood, the herein disclosed apparatus provides an indication of load capacity of the workman's platform apparatus at a given boom elevation and extension, and within zone limits. For example, there is shown in color coded strip **47*b*** two zones, one of which may indicate a capacity of 500 pounds and the other which may indicate a capacity of 600 pounds. As will be apparent, a slight change in degree will not change the capacity by 20%. Therefore, the zones are chosen to provide a suitable margin of safety.

The control panel 31, being fixed to the workman's platform 30, moves with it, and, therefore, when the workman's platform 30 has been rotated about the vertical axis provided by the vertical pivot pin 34, the colored indicator strips 27*a*, 27*b* and 27*c* will always be visible, depending, of course, on the amount of extension of fly section 22, to the workman at the control console 31. Regardless of the angular position of the workman's platform 30 on the vertical axis, the indicator plate 45 will be driven by the Bowden cable 40 so as to be in position relative to the angle of inclination of the boom 20, and, as will be understood, the Bowden cable 40 will not be affected by the angular position of the workman's platform 30 as it is horizontally rotated, but Bowden cable 40 will cause the indicator plate 45 to move, regardless of the horizontal position of the workman's platform 30.

There has been provided a workman's lift platform apparatus having an arrangement for indicating the capacity thereof at any angle and extension of the boom, which indicator is of simple and reliable construction, and which is readily observable by a workman at the control console in any position of the boom, and in any position of the workman's platform relative the boom, where the workman's platform is rotatable about a vertical axis. Further, the capacity indicator is always visible and readily comprehensible to a workman in the workman's platform.

It will be obvious to those skilled in the art that various changes may be made without departing from the spirit of the invention, and therefore the invention is not limited to what is shown in the drawings and described in the specification but only as indicated in the appended claims.

We claim:

1. In a workman's lift platform apparatus comprising a telescopic boom pivotally mounted for luffing movement about a horizontal axis and having base and fly sections, means for extending and retracting the telescopic boom, means for luffing the boom, a workman's platform adjacent the outer end of the boom, a horizontal pivotal connection between the platform and the boom, means for maintaining the platform level during luffing movement of the boom, and control means on the workman's platform for controlling boom luffing and boom extension, the improvement comprising:

means on the fly section of the boom visible to a workman at said control means for visually indicating the amount of extension of the boom, an indicator plate on said platform adjacent said control means having thereon visual indicating means corresponding to the indicating means on said boom fly section, a cursor adjacent said indicator plate, and means for moving said indicator plate proportionately to the angle of the boom to the horizontal.

2. Apparatus according to claim 1, wherein said visual indicating means on the fly section of the boom comprises color coding indicia, and wherein said visual indicating means on said indicator plate comprises corresponding color coding.

3. Apparatus according to claim 1, wherein said last mentioned means comprises flexible means movable in proportion to the movement of the platform about the pivotal connection between the platform and the boom.

4. Apparatus according to claim 3, said flexible means including a Bowden cable having a sheath and an inner wire, means attaching one end of said sheath to said platform adjacent said indicator place, and means attaching the other end of said sheath to said boom.

5. Apparatus according to claim 4, said inner wire extending out of the end of said sheath attached to said boom, said horizontal pivotal connection including a pivot pin, said inner wire passing in partial circumscribing relation to said pivot pin, and anchor means on said boom securing the end of said inner wire to said boom.

6. Apparatus according to claim 4, said inner wire extending out of the end of said sheath attached to said platform, a sheave journalled on said platform, said indicator plate attached to said sheave, and said inner wire attached to said sheave.

7. Apparatus according to claim 6, and spring means urging said wire through said sheath towards said indicator plate.

8. Apparatus according to claim 1, and further including vertical pivotal connection means between said platform and said boom, means for rotating said platform on said vertical pivotal connection means, said means for moving said indicator plate moving said indicator plate proportionately to the angle of the boom to the horizontal in any position of said platform after rotation about said vertical axis.

9. Apparatus according to claim 8, wherein said means for moving said indicator plate comprises flexible means movable in proportion to the movement of the platform about the horizontal pivotal connection between the platform and the boom.

10. Apparatus according to claim 9, said flexible means comprising a Bowden cable having a sheath anchored at one end to said platform adjacent said indicator plate and at the other end to said boom, an inner wire extending out said sheath, means connection one end of said wire to said indicator plate and means connecting the other end of said wire to said boom.

11. Apparatus according to claim 10, said means connecting said one end of said wire to said indicator plate comprising a sheave, said wire fastened to said sheave, said indicator plate secured to said sheave, and spring means for pulling said inner wire through said sheath towards said indicator plate.

12. In a workman's lift platform apparatus comprising a telescopic boom pivotally mounted for luffing movement about a horizontal axis and having base and fly sections, means for extending and retracting the telescopic boom, means for luffing the boom, a workman's platform adjacent the outer end of the boom, a horizontal pivotal connection between the platform and the boom, means for maintaining the platform level during luffing movement of the boom, vertical pivotal connection means between said platform and said boom, means for rotating said platform on said vertical pivotal connection means through substantially 180°, and control means on the workman's platform for controlling boom luffing and boom extension, the improvement comprising:

means on the fly section of the boom visible to a workman at said control means for visually indicating the amount of extension of the boom, movable indicator means on said platform adjacent said control means having thereon visual indicating means corresponding to the indicating means on said boom fly section, and means operable from said boom fly section for moving said indicator mean means proportionately to the angle of said boom to the horizontal in any angular position of said platform on said vertical axis.

13. Apparatus according to claim 12, said last mentioned means comprising a Bowden cable.

14. Apparatus according to claim 13, said Bowden cable having an outer sheath, and an inner wire anchored at one end to said boom and connected adjacent the other end thereof to said movable indicator means.

15. Apparatus according to claim 14, and spring means urging said inner wire towards said indicator means.

16. Apparatus according to claim 14, an end of said outer sheath of said Bowden cable anchored to said platform substantially adjacent the axis of said vertical pivotal connection means.

17. Apparatus according to claim 16, said Bowden cable adjacent to the said end thereof being substantially parallel to said last mentioned axis.

* * * * *